May 16, 1933.  B. B. RANDRUP  1,909,869
AUTOMOBILE WHEEL WASHER
Filed Sept. 8, 1930    2 Sheets-Sheet 1
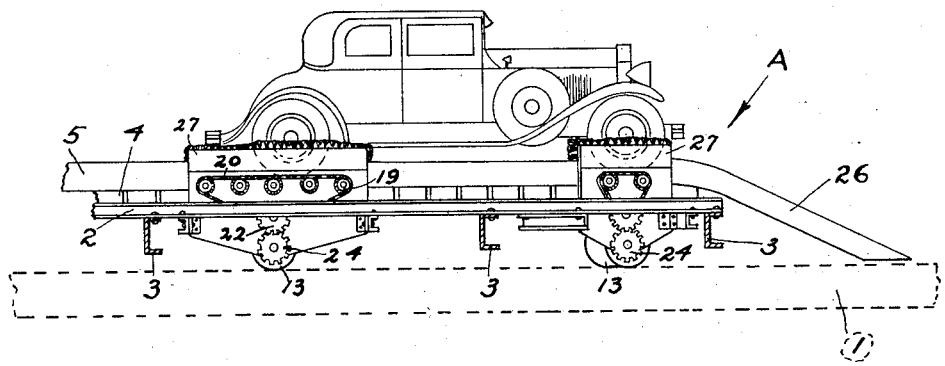
Fig-1.
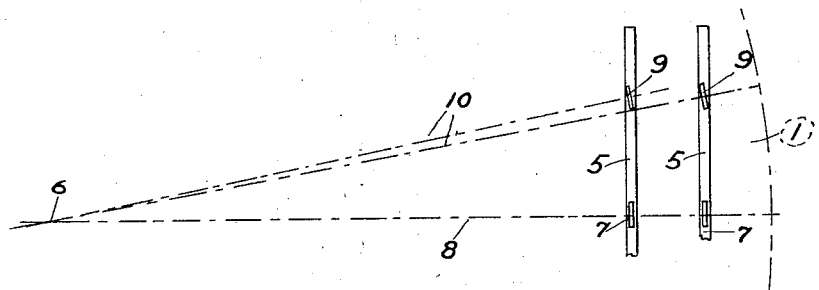
Fig-2.
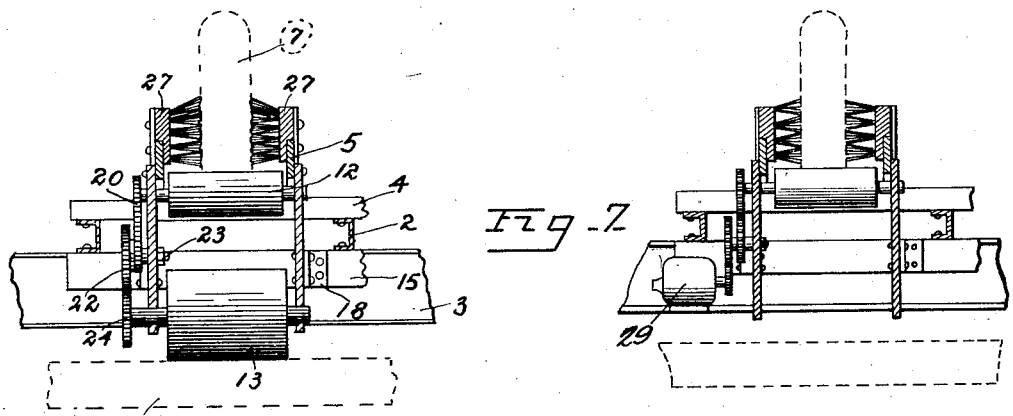
Fig-7.
Fig-6.
INVENTOR.
BENJAMIN B. RANDRUP.
BY Munn & Co.
ATTORNEYS.

May 16, 1933.  B. B. RANDRUP  1,909,869
AUTOMOBILE WHEEL WASHER
Filed Sept. 8, 1930  2 Sheets-Sheet 2

INVENTOR.
BENJAMIN B. RANDRUP.
BY Munn & Co.
ATTORNEYS.

Patented May 16, 1933

1,909,869

UNITED STATES PATENT OFFICE

BENJAMIN B. RANDRUP, OF SAN FRANCISCO, CALIFORNIA

AUTOMOBILE WHEEL WASHER

Application filed September 8, 1930. Serial No. 480,579.

The present invention relates to improvements in automobile wheel washers, and its principal object is to provide, in connection with a general automobile washing system, a particular stage in which the wheels may be washed expeditiously without interrupting the continuity of the washing operation.

In washing an automobile various systems use a conveyor on which the automobile is placed and slowly advanced from station to station for allowing different cleaning operations to be performed, one of which is the cleaning of the wheels.

A conveyor system to which my invention is particularly well adapted is the one disclosed in the Wilde and Gillespie Patent #1,613,213 of January 4, 1927. In this system, like the embodiment chosen for illustration, a turn-table or conveyor portion of the apparatus rotates continuously and thus transports the automobiles to various stations about the turntable where different parts of the automobile are washed.

The present invention relates particularly to the wheel-washing operation and it is proposed to provide means in connection with the conveyor mentioned for supporting the automobile in such a manner that the wheels are operated and revolved by the advancing conveyor while the automobile is prevented from moving so that the revolving wheels may be cleaned by a suitable set of fixed brushes mounted on opposite sides thereof.

Further objects and advantages of my invention will appear as the specification proceeds.

The preferred form of my invention is illustrated in the accompanying drawings, in which:

Figure 1 shows my device in side elevation,

Figure 2 shows a schematic view of the invention,

Figure 6 is an end elevation of one of the washing mechanisms, and

Figure 7 is an end elevation of a modified form of my invention.

Figure 3:
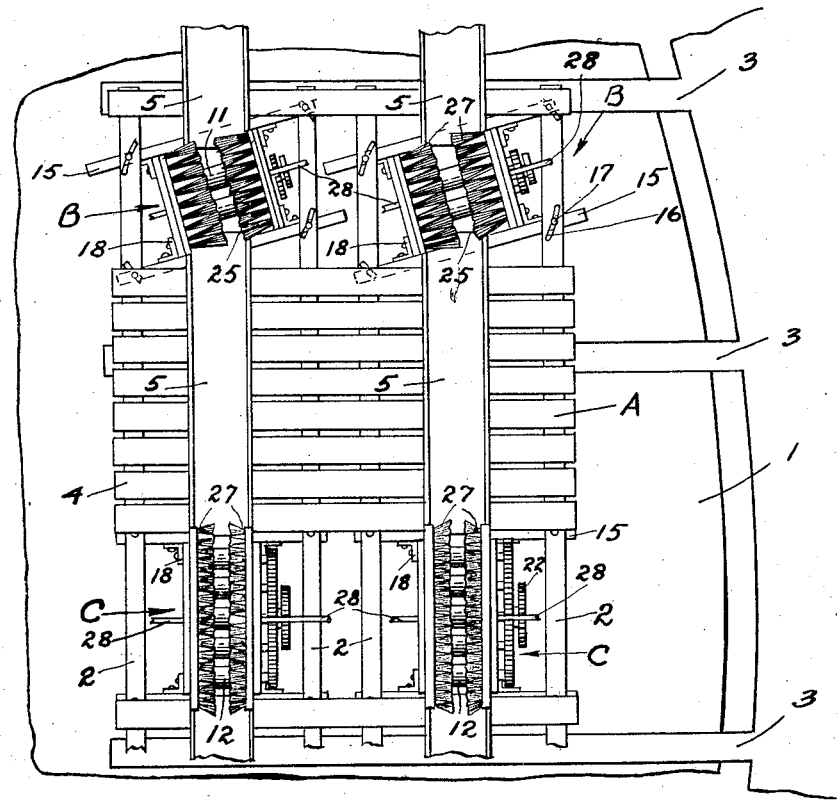
Figure 3 is a top plan view of the washing platform.

In carrying out my invention I provide an automobile-supporting platform indicated generally at A, and this may be disposed above a standard turntable 1 used in washing cars, or it may be disposed above an endless conveyor which moves the cars along a straight line during the washing operation rather than around a circle. Figures 1, 2 and 3 indicate the device as being used in connection with a turntable, but I do not wish to be confined to this particular use. In fact, the car can remain upon the platform A during the entire washing operation, the wheels being washed in a manner hereinafter described while the attendants clean the other parts of the car.

The platform A (see Figure 3) comprises supporting channel-beams 2, these being carried by main channel irons 3 (see Figure 1) that are disposed above the moving turntable or conveyor and are held against lateral movement by any means not carried by the turntable. In this way the platform remains stationary while the turntable or conveyor moves beneath the platform. Planks 4 are mounted on the I-beams 2, and these planks carry runways 5 for the automobile wheels.

When my improvement is used in a system similar to that illustrated in the above referred to Wilde and Gillespie patent my platform A may be disposed at the point where the automobiles are placed upon the platform or at the point where they are discharged therefrom. It is also possible that I may install my improvement at other points about the conveyor.

In the schematic view shown in Figure 2 the point 6 designates the center of the turntable 1, and the runways 5 are shown disposed above the turntable. The entrances to the runways 5 are disposed off from the turntable 1 for permitting an automobile to ride upon the runways. The car is moved until the rear wheels 7 have their axes coinciding with a radial line 8 of the turntable 1. If a conveyor is used in place of the turntable, the front wheels 9 of the automobile are not turned into an angular position. In Figure 2 I have shown the front wheels 9 turned so as to have their axes coincide with radii 10 of the turntable. The reason for turning the front wheels 9 into an angular position when the device is disposed above a turntable will be explained hereinafter.

Figures 4, 5:
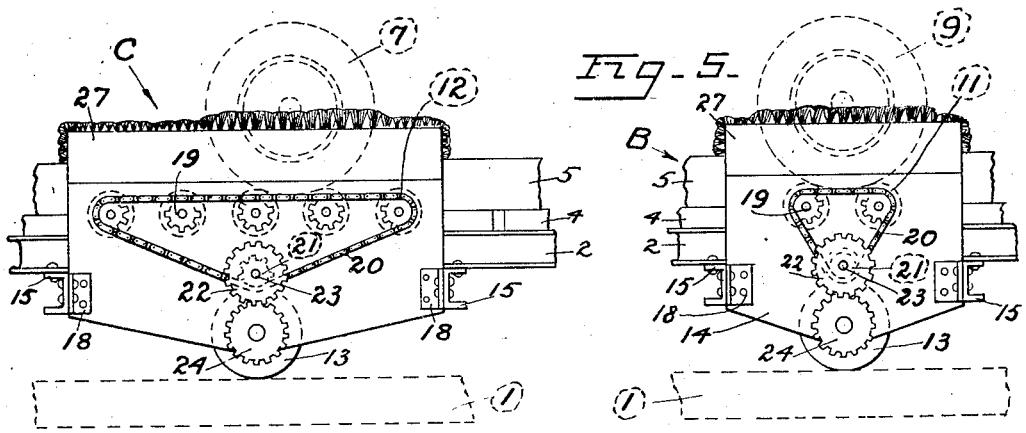
Figure 4 is an enlarged detail of the washing mechanism of the rear wheels.
Figure 5 is a similar view showing the washing mechanism for the front wheels.

A wheel washing mechanism is provided for each wheel, and Figures 4 and 5 illustrate the mechanisms for the rear and front wheels respectively. It is desired to continuously rotate the wheels during the washing operation while holding the automobile in one position, and this is accomplished by rollers 11 for the front wheels 9 (see Figure 5) and rollers 12 for the rear wheels 7 (see Figure 4). The rollers are disposed far enough apart to prevent the car from moving forwardly when the rollers are rotated but to cause the wheels to rotate. The power for driving the rollers 11 and 12 is obtained from the rotating turntable 1 or from the endless conveyor. If the turntable is used as the source of power, a driving wheel 13 of the front wheel washer B must be turned into a position where the axis of the wheel 13 coincides with one of the radii 10. The wheel 13 is carried by a frame 14 (see Figure 5), and this same frame carries the rollers 11 and therefore the rollers will be turned at the same angle as the wheel 13. Because of this angular position of the rollers 11 the front wheels 9 of the automobile must be turned into the same angular position.

I have therefore provided a front wheel washing mechanism which may be turned into the desired angular position when the device is used in connection with a turntable. This same washing mechanism can be disposed in the same straight line with the rear wheel washing mechanism when the device is used in connection with a straight conveyor belt. Figure 3 clearly shows how the front wheel washing mechanisms B are disposed in angular positions. These are supported by channel irons 15 which carry receiving bolts 17 that engage arcuate slots 16 for securing the channels 15 to the channel-beams 2. The arcuate slots 16 permit the mechanism B to be shifted about a center into the desired angular position. Both front wheel washing mechanisms B are identical and therefore a description of one will suffice.

The sides 14 are secured to the channel irons 15 by brackets 18, and these sides carry the rollers 11 which support the automobile wheel 9. The sprockets 19 (see Figure 5) are operatively connected to the rollers 11, and a chain 20 connects the sprocket wheels with a second sprocket wheel 21. The sprocket wheel 21 is integral with a gear 22, and both are mounted upon a shaft 23 carried by one of the sides 14. The gear 22 meshes with a gear 24 that is operatively connected to the wheel 13. It will be seen from this construction that a movement of the turntable or conveyor 1 will rotate the wheel 13 and will also rotate the rollers 11.

The rear wheel washing mechanism C is identical to that shown for the front wheels except that more rollers 12 are used than rollers 11. This is to accommodate cars of different lengths. Since all of the other parts are identical, like reference numerals will be applied. The rear washing wheel mechanisms are aligned with the runways 5 as shown in Figure 3. These runways terminate at 25 for permitting the front wheel washing mechanisms to be turned into the desired angle when the device is used over a turntable. The runways 5 continue on the other side of the front wheel washing mechanisms B and are inclined downwardly at 26 (see Figure 1) so as to provide overhanging aprons which guide the car down upon the turntable 1 or the endless conveyor.

The sides 14 of the wheel washing mechanisms B and C carry brushes 27, and these brushes extend toward each other so as to engage with the automobile wheels. Conduits 28 carry washing solutions to the brushes, and the wheels turning within the brushes are cleaned by the solution. After the wheels have been washed, they may be locked against movement by applying the brake of the automobile, and the further rotation of the rollers 11 and 12 will cause the car to be moved off from the rollers and onto the runways 5. Of course the operator straightens out the front wheels as soon as they reach the runways 5. The automobile wheels, when free of the rollers 11 and 12, are in a position where the front wheels will be on the inclined portion 26 of the guideways, and the car will therefore gravitate down upon the turntable or the endless conveyor.

If desired, a separate motor 29 can be applied to the rollers 11 and 12 as illustrated in Figure 7 and the car can remain in one position during the entire washing operation as set forth in the first part of the specification.

Although I have shown and described one embodiment of my invention, it is to be understood that the same is susceptible of various changes, and I reserve the right to employ such changes as may come within the scope of the claims hereto annexed.

I claim:

1. In an automobile wheel washer, a conveyor, a stationary platform located above said conveyor having drums in driving relation with the conveyor whereby the drums are rotated when the conveyor advances, spaced rollers on the platform adapted to support the wheels of an automobile thereon, a driving connection between the drums and the rollers whereby the latter and the wheels are revolved, and means for cleaning the revolving wheels.

2. In an automobile wheel washer, a movable conveyor, a plurality of spaced rollers supported against lateral movement above a portion of the conveyor and adapted to support the wheels of an automobile thereon, a driving connection between the conveyor and the rollers whereby the latter and the wheels are revolved as the conveyor moves, means for cleaning the revolving wheels, and a supporting driveway for directing the automobile from said rollers to the conveyor for further washing operations.

3. In an automobile wheel washer, an elevated platform, a plurality of rollers carried by and located to form a tread surface upon said platform, means for supporting said rollers in spaced relation so as to allow the wheels of an automobile to rest thereon, a holding means for said platform capable of permitting a relative movement between it and a surface immediately under the elevated platform, and means engaging the surface beneath said platform for imparting revolving motion to the rollers whereby the automobile wheels are turned as the platform moves with respect to said surface.

4. In an automobile wheel washer, a movable conveyor, an elevated platform mounted above the conveyor having a driveway leading down to the conveyor, means associated with the platform for revolving the wheels of an automobile stationed thereon as said conveyor moves with respect to said platform, and means for washing the revolving wheels.

5. In an automobile wheel washer, a revolving conveyor, a stationary platform supported above said conveyor, a frame upon said platform adjustable into different angular positions with respect to the platform rollers carried by said frame for supporting an automobile wheel, means engaging said conveyor for rotating said rollers, whereby the wheel will be turned as said conveyor revolves, and cleaning means associated with the frame for washing the wheel as it is turned.

6. In an automobile washing apparatus, a turntable, an elevated platform above said turntable upon which an automobile may be carried, rollers upon said platform adapted to engage the wheels of the automobile, a plurality of rollers beneath said platform adapted to engage an underlying surface of the turntable, and a driving connection between the rollers upon said platform and the rollers beneath the platform adapted to rotate the rollers upon said platform and turn the wheels of the automobile in response to any relative movement between the platform and said underlying turntable surface.

BENJAMIN B. RANDRUP.